United States Patent
Dunn et al.

(10) Patent No.: US 10,600,141 B2
(45) Date of Patent: Mar. 24, 2020

(54) MONITORING EXECUTION IN A GRAPHICS PROCESSING UNIT

(71) Applicant: NVIDIA CORPORATION, Santa Clara, CA (US)

(72) Inventors: Alexander Dunn, Santa Clara, CA (US); Jon Jansen, Santa Clara, CA (US); Gabriel Liberty, Santa Clara, CA (US); Jonathan Robbins, Santa Clara, CA (US); Jason Mawdsley, Santa Clara, CA (US)

(73) Assignee: Nvidia Corporation, Santa Clara, CA (US)

(*) Notice: Subject to any disclaimer, the term of this patent is extended or adjusted under 35 U.S.C. 154(b) by 252 days.

(21) Appl. No.: 15/713,484

(22) Filed: Sep. 22, 2017

(65) Prior Publication Data

US 2018/0089793 A1    Mar. 29, 2018

Related U.S. Application Data

(60) Provisional application No. 62/399,246, filed on Sep. 23, 2016.

(51) Int. Cl.
*G06F 11/00* (2006.01)
*G06T 1/20* (2006.01)
*G06T 1/60* (2006.01)
*G06F 11/36* (2006.01)

(52) U.S. Cl.
CPC ............ *G06T 1/20* (2013.01); *G06F 11/3636* (2013.01); *G06T 1/60* (2013.01)

(58) Field of Classification Search
CPC .......... G06T 1/20; G06T 1/60; G06T 2200/28; G06F 9/30079; G06F 9/38; G06F 9/3867; G06F 9/3877; G06F 11/0769; G06F 11/0766; G06F 11/07778; G06F 11/0787; G06F 11/079; G06F 11/3636; G06F 11/366

See application file for complete search history.

(56) References Cited

U.S. PATENT DOCUMENTS

| | | |
|---|---|---|
| 6,314,530 B1 | 11/2001 | Mann |
| 8,368,701 B2 | 2/2013 | Paltashev et al. |
| 8,817,029 B2 | 8/2014 | Brothers et al. |
| 9,275,429 B2 | 3/2016 | Alla et al. |
| 9,417,767 B2 * | 8/2016 | Roy ..................... G06T 15/005 |
| 9,478,000 B2 | 10/2016 | Rao et al. |
| 9,648,325 B2 | 5/2017 | Baeza et al. |
| 10,073,719 B2 * | 9/2018 | Rajwar ............... G06F 11/3476 |

(Continued)

*Primary Examiner* — Marc Duncan (57) ABSTRACT

Marker commands are added to a stream of commands that are executed by a graphics processing unit (GPU) in a computing system. While the GPU executes the commands, information is written to a memory location each time a marker is reached in the pipeline. The memory location is accessible to the central processing unit (CPU), and the information identifies a command executed by the GPU. If the CPU receives an indication that the GPU is in an invalid state, then the CPU responds by accessing the memory location to identify the command executed in the pipeline of the GPU. Consequently, a command that was executing when the GPU entered the invalid state can be identified. This information can be used to pinpoint the cause of the invalid state.

19 Claims, 5 Drawing Sheets

500

| 502 |
|---|
| PIPELINE OF GPU RECEIVES STREAM OF COMMANDS INCLUDING MARKER COMMANDS FROM THE CPU |

| 504 |
|---|
| WRITE INFORMATION IDENTIFYING A CORRESPONDING COMMAND TO MEMORY EACH TIME A MARKER COMMAND IS REACHED |

(56) References Cited

U.S. PATENT DOCUMENTS

| | | | |
|---|---|---|---|
| 2011/0029819 A1* | 2/2011 | Mehta | G06F 11/3644 714/38.12 |
| 2014/0022266 A1* | 1/2014 | Metz | G06F 9/4806 345/522 |
| 2015/0235338 A1* | 8/2015 | Alla | G06T 1/20 345/522 |
| 2016/0189681 A1 | 6/2016 | White et al. | |
| 2016/0358304 A1* | 12/2016 | Wang | G06F 11/3636 |
| 2017/0090846 A1* | 3/2017 | Verma | G06F 3/1431 |

\* cited by examiner

| TIME | CONTENT OF FIRST MEMORY LOCATION 132 |
|---|---|
| t0 | -- |
| t1 | -- |
| t2 | -- |
| t3 | A |
| t4 | A |
| t5 | A |
| t6 | C |
| t7 | C |
| t8 | B |

| TIME | CONTENT OF FIRST MEMORY LOCATION 132 | CONTENT OF SECOND MEMORY LOCATION 134 |
|---|---|---|
| t0 | A | -- |
| t1 | A | -- |
| t2 | B | -- |
| t3 | B | A |
| t4 | B | A |
| t5 | C | A |
| t6 | C | C |
| t7 | C | C |
| t8 | C | B |

MONITORING EXECUTION IN A GRAPHICS PROCESSING UNIT

RELATED APPLICATION

This application claims priority to U.S. Provisional Application No. 62/399,246, entitled "Method for Detecting GPU Stall Location Using DX12," filed on Sep. 23, 2016, which is hereby incorporated by reference in its entirety.

BACKGROUND

While executing commands for an application (e.g., a gaming application), a graphics processing unit (GPU) may enter an "invalid state." In an invalid state, the GPU may crash, lock up, freeze, or stall, for example. The Windows® operating system, for example, includes a feature known as timeout detection and recovery (TDR). If the GPU enters an invalid state, TDR resets the GPU and debugging can begin to try to gain an understanding of what caused the invalid state.

However, there is very little or no information of use that can be used to easily and/or quickly pinpoint the cause of the invalid state. Commands can be executed in parallel on the GPU, and so the central processing unit (CPU) call stack does not provide the required information. The GPU, because it is in an invalid state, cannot be accessed to determine which command may be the source of the problem.

Consequently, end users of the application do not have the information to debug or fix the application without outside intervention, and so are forced to contact the application developer. The application developer can look at the CPU call stack, but this does not provide enough information to pinpoint the source of the invalid state as mentioned above. Hence, the application developer in turn has to contact the GPU developer and/or the operating system developer for assistance. This process can be both time consuming and costly and still might not yield the root cause of the invalid state.

SUMMARY

Embodiments according to the invention add marker commands to a stream of commands that are executed by a graphics processing unit (GPU) in a computing system. The marker commands can be included in the application (e.g., a gaming application) being executed by the computing system. In an embodiment, the as-shipped application already includes the marker commands. Alternatively, an end-user can add marker commands to the application.

In an embodiment, the GPU receives a stream of commands from a central processing unit (CPU) into a pipeline. The stream of commands includes commands such as, but not limited to, draw commands or compute commands. The stream of commands also includes marker commands ("markers") that are interleaved within the other commands. While the GPU executes the commands, information is written to a memory location each time a marker is reached in the pipeline. The memory location is accessible to the CPU, and the information identifies a command executed by the GPU. In particular, the information can be used to identify the last (most recent) command executed by the GPU. In an embodiment, the information in the memory location includes the CPU's call stack of the last command executed by the GPU. In an embodiment, the information in the memory location includes human-readable text that can be used to identify the last command executed by the GPU. In general, the information in the memory location is sufficient to uniquely identify a command (e.g., the last or most recent command) executed by the GPU.

If the CPU receives an indication that the GPU is in an invalid state, then the CPU responds by accessing the memory location to identify a command that was executed in the pipeline of the GPU before the GPU entered the invalid state. For example, the last (most recent) command successfully executed by the GPU can be identified, in which case the command that was executing when the GPU entered the invalid state can be identified. This information can be used to easily and quickly pinpoint the cause of the invalid state. End users and application developers will have the information to debug or fix the application without outside intervention or assistance from the GPU developer and/or the operating system developer. Thus, time and resources are saved and costs are reduced.

In an embodiment, the information identifying a command (e.g., the last command) executed by the GPU is written to the same memory location, overwriting any information previously stored there. Because the same memory location is used each time, the CPU does not need to search for that information and the GPU does not need to search for where to place that information.

In an embodiment, a marker is placed immediately after a command in the stream of commands. The marker causes information that identifies that command to be written to the memory location after the command finishes executing. A marker can be placed immediately after each command in the stream, although the invention is not so limited.

In an embodiment, markers are placed immediately before and immediately after a command in the stream of commands. The markers cause information that identifies that command to be written to the memory location before the command starts executing and after the command finishes executing. Markers can be placed before and after each command in the stream, although the invention is not so limited.

In an embodiment, a marker is a flag associated with a respective command. The flag causes information that identifies the command to be written to the memory location when that command is executed.

In an embodiment, a marker is a semaphore that follows a respective command. Execution of the semaphore causes information that identifies the command to be written to the memory location.

The GPU may include multiple, parallel pipelines. In that case, a memory location is associated with each of the pipelines.

These and other objects and advantages of the various embodiments of the present invention will be recognized by those of ordinary skill in the art after reading the following detailed description of the embodiments that are illustrated in the various drawing figures.

BRIEF DESCRIPTION OF DRAWINGS

The accompanying drawings, which are incorporated in and form a part of this specification and in which like numerals depict like elements, illustrate embodiments of the present disclosure and, together with the detailed description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "sending," "executing," "writing," "reading," "identifying," "accessing," or the like, refer to actions and processes (e.g., the flowcharts 500 and 600 of FIGS. 5 and 6, respectively) of a computing system or similar electronic computing device or processor (e.g., the system 100 of FIGS. 1 and 2). The computing system or similar electronic computing device manipulates and transforms data represented as physical (electronic) quantities within the computing system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Figure 1:
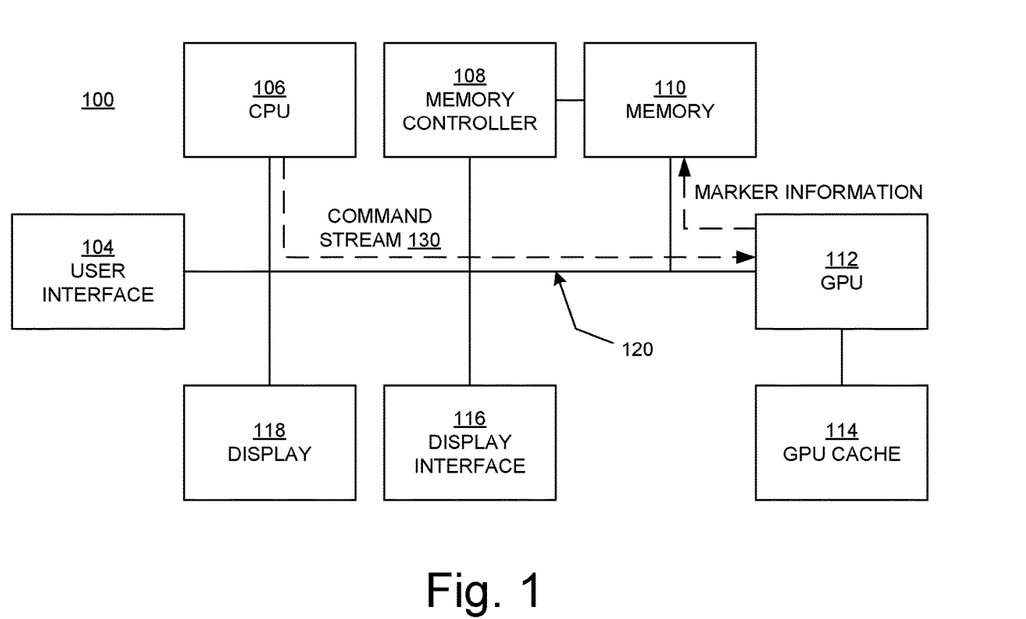
FIGS. 1 and 2 are block diagrams illustrating an example computing system upon which embodiments according to the present invention can be implemented.

FIG. 1 is a block diagram illustrating an example computing system 100 upon which embodiments according to the present invention can be implemented. The computing system 100 may be, but is not limited to, a computer, a video game platform or console, a wireless communication device (e.g., a smartphone). In general, the computing system 100 is a type of device that processes and/or displays graphical data.

In the example of FIG. 1, the computing system 100 includes a user interface 104, a central processing unit (CPU) 106, a memory controller 108, a memory 110, a graphics processing unit (GPU) 112, a GPU cache 114, a display interface 116, and a display 118, each of which can communicate with the other components using bus 120. A computing system on which embodiments according to the present invention can be implemented may include other components in addition to those just listed, or it may not include all of the listed components.

The memory 110 is accessible to both the CPU 106 and the GPU 112. Significantly, the memory 110 is accessible to the CPU 106 even if the GPU 112 is in an invalid state. An invalid state may result when, for example, the GPU crashes, locks up, freezes, or stalls.

In an embodiment, the GPU 112 has a highly-parallel structure. For example, with reference also to FIG. 2, the GPU 112 may include multiple processing elements (e.g., the pipelines 221 and 222) that are configured to operate in a parallel manner. There may be more than two pipelines.

Figure 2:
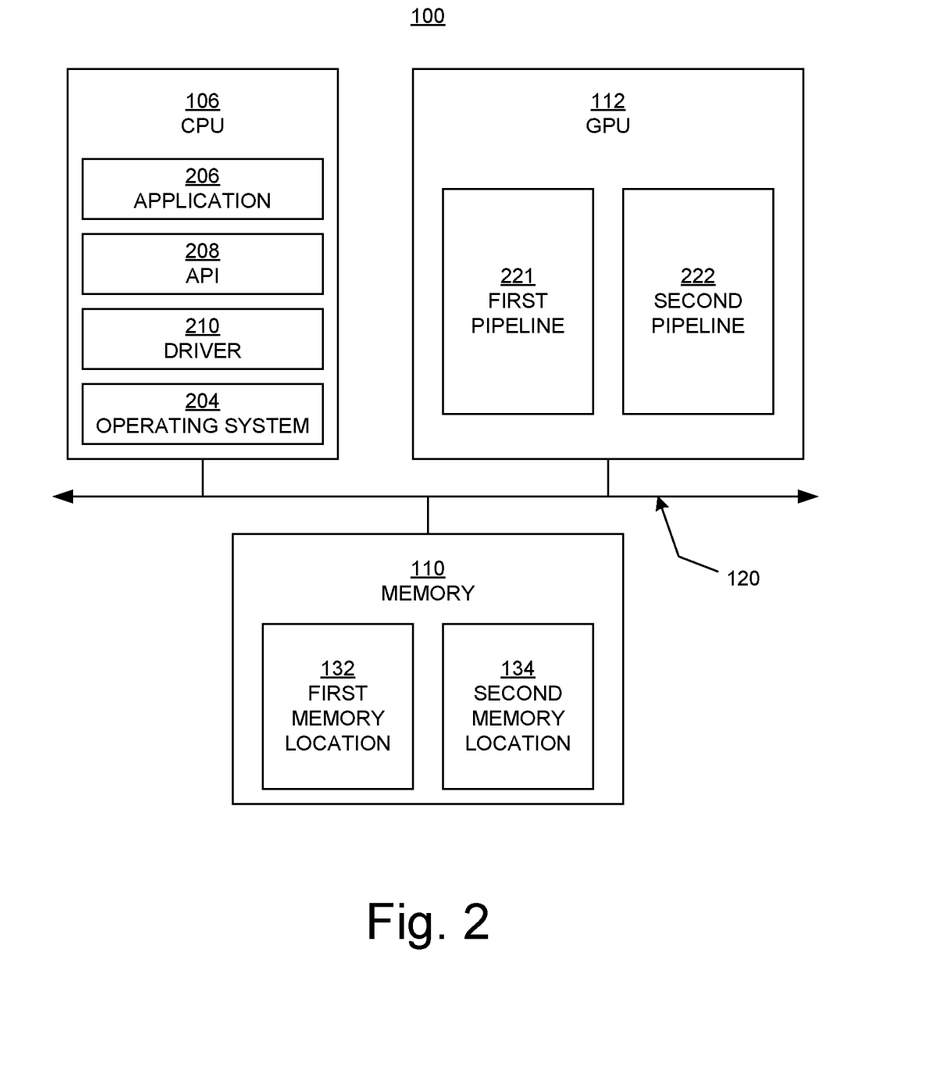

Each pipeline can include more than one processing units or stages such as programmable shader units.

The CPU 106 can execute one or more software applications. The software applications that execute on the CPU 106 include, but are not limited to, an operating system 204 and an application 206 such as but not limited to a video game application. The software applications that execute on the CPU 106 may include one or more graphics rendering instructions that instruct the GPU 112 to execute and provide graphics data to the display 118. In some examples, the software instructions may conform to a graphics application programming interface (API) 208, such as, but not limited to, a DirectX API (e.g., DX12). The CPU 106 issues a command stream containing one or more graphics rendering commands (such as but not limited to draw commands) to the GPU 112 to cause the GPU to perform some or all of the rendering of the graphics data. The CPU 106 can also issue other types of commands to the GPU 112, such as but not limited to compute commands (e.g., general purpose computing commands, state programming commands, memory transfer commands, etc.). In an embodiment, a GPU driver 210 receives the instructions from the software application 206, via the API 208, and controls the operation of the GPU 112 to service the instructions.

Embodiments according to the invention add marker commands (which may also be referred to herein as markers) to a stream of commands that are executed by the GPU 112. The marker commands can be included in the application (e.g., a gaming application) being executed by the computing system 100. In an embodiment, the as-shipped application 206 (e.g., a video game application) already includes the marker commands. Alternatively, an end-user can add marker commands to the application 206.

In an embodiment, the marker commands are implemented as "semaphores" that release a respective payload to a specified location in the memory 110. The payload is the information ("marker information") that uniquely identifies the associated draw or compute command. In another embodiment, the marker commands set flags that are carried through the pipeline in the GPU 112 with their respective draw or compute command. In the latter embodiment, when a flag reaches the last stage of the pipeline, then the pipeline is instructed to write the marker information for the respective command to the specified location in the memory 110. The same memory location is used to receive the marker information for each command executed by the GPU 112. By using the same specified memory location, the GPU 112 does not need to search for where to place the marker information. The marker information consumes a relatively very small portion of the memory 110.

As noted above, different types of commands can be executed by the GPU 112. Below is an example (Example 1) of a stream of draw commands, where A, B, and C may be primitives (e.g., triangles), for example. The marker commands are interleaved or interspersed with the draw commands as shown in the example below. The marker command associated with the draw A command is referred to marker A, and so on:

draw A;
marker A;
draw B;
marker B;
draw C;
marker C.

With reference to FIG. 1, a command stream 130 like the above example is encoded by the CPU 106 and sent to the GPU 112 (e.g., to the pipeline 221, which may be referred to herein as the first pipeline).

In this and other examples presented herein, each draw or compute command is associated with a marker command. However, the invention is not so limited. For example, groups of commands can occur logically over a frame of data, representing discrete tasks such as lighting or postFX, and a marker command can be associated with a group of such commands.

In operation, the GPU 112 executes the draw A command. When execution of the draw A command is successfully completed, the marker A command is executed or processed. The marker A command causes marker information to be written to a specified location 132 in the memory 110. The maker information written to the memory 110 identifies the most recent (last) draw command that was successfully executed to completion (e.g., draw A). In an embodiment, the marker information is or includes human-readable text information that uniquely identifies draw A as the most recent successfully completed draw command. In an embodiment, the marker information is or includes the call stack of the most recently completed draw command.

Continuing with Example 1, the GPU 112 executes the draw B command. As will be described further in conjunction with FIGS. 3A and 4A below, the draw B command may be executed in parallel with the draw A command. That is, the time period during which the draw A command is executing may overlap the time period during which the draw B command is executing. When execution of the draw B command is successfully completed, the marker B command is executed or processed. The marker B command causes information identifying the draw B command to be written to the same specified location 132 in the memory 110. As noted above, by using the same memory location, the GPU 112 does not need to search for where to place the marker information.

Thus, if execution of the draw A command is successfully completed before execution of the draw B command, then the memory location 132 will contain information identifying the draw A command, which will subsequently be overwritten by the information identifying the draw B command once execution of the draw B command is successfully completed. Conversely, if execution of the draw B command is successfully completed before execution of the draw A command, then the memory location 132 will contain information identifying the draw B command, which will subsequently be overwritten by the information identifying the draw A command once execution of the draw A command is successfully completed.

The operations just described are repeated for the draw C command and any other commands in the command stream 130. In general, more than one command may be executing on the GPU 112 at a time, and the memory location 132 will include information that identifies a successfully completed command. In the above example, in which a marker command follows each draw command, the most recent successfully completed command can be identified.

Figure 3A:
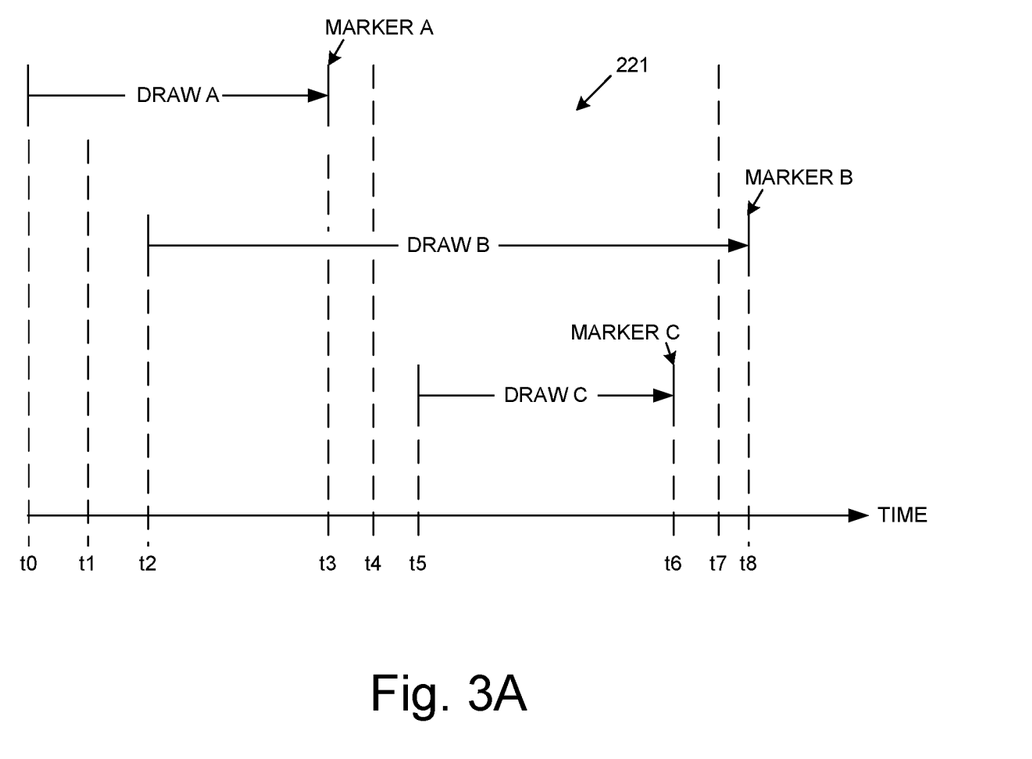
FIG. 3A is a timeline illustrating execution of commands in a pipeline in embodiments according to the present invention.

FIG. 3A is a timeline illustrating Example 1. In the example of FIG. 3A, the draw A, draw B, and draw C commands are executing in parallel in the pipeline 221 of the GPU 112. Before the draw A command finishes executing in the pipeline 221, the draw B command enters the pipeline; and before the draw B command finishes executing in the pipeline, the draw C command enters the pipeline. In this example, if the GPU 112 does not enter an invalid state, then the draw A command will finish executing before the draw B command finishes executing, and the draw B command will finish executing after the draw C command finishes executing. Thus, in this example, if the GPU 112 does not enter an invalid state, then the contents of the memory location 132 will be, in turn, information identifying the draw A command, then information identifying the draw C command, then information identifying the draw B command.

Figure 3B:
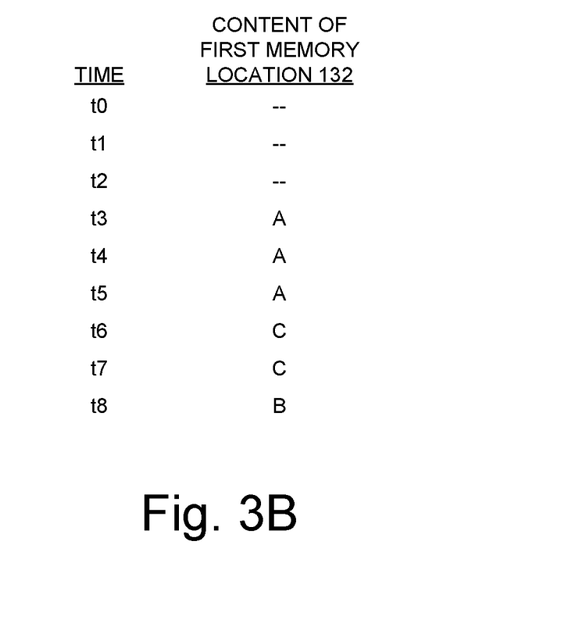
FIG. 3B illustrates the contents of a memory location at various points in time during execution of commands in a pipeline in embodiments according to the present invention.

FIG. 3B illustrates the contents of the memory location 132 at various points in time if each of the draw A, draw B, and draw C commands of Example 1 executes successfully, where A refers to the marker information identifying the draw A command, B refers to the marker information identifying the draw B command, and C refers to the marker information identifying the draw C command.

If, however, the GPU 112 enters an invalid state before time t3 (e.g., at time t1), then the draw commands are not executed and the memory location 132 does not include any valid information. If the GPU 112 enters an invalid state between times t3 and t5 (e.g., at time t4), then the memory location 132 includes information identifying the draw A command. If the GPU 112 enters an invalid state between times t6 and t8 (e.g., at time t7), then the memory location 132 includes information identifying the draw C command. Thus, in this example, the marker information in the memory location 132 can be used to identify the command that was executing, or the last command to successfully execute, in the pipeline 221 when the GPU 112 entered the invalid state. The marker information resides in the memory 110, which can be accessed by the CPU even if the GPU 112 is in an invalid state.

Below is another example (Example 2) of a stream of draw commands that include markers:
marker A—in;
draw A;
marker A—out;
marker B—in;
draw B;
marker B—out;
marker C—in;
draw C;
marker C—out.

In Example 2, a first marker command (marker A—in) associated with the draw A command is placed before the draw A command in the command stream 130, and a second marker command (marker A—out) associated with the draw A command is placed after the draw A command in the command stream, and so on. Accordingly, when the draw A command enters the pipeline 221, then marker information identifying the draw A command is written to the memory location 132 and, when execution of the draw A command is successfully completed, then information identifying the draw A command is written to a specified second memory location 134 in the memory 110. In a manner similar to that described above, when the draw B command enters the pipeline 221, then information identifying the draw B command is written to the same first memory location 132, overwriting any information that may be already there, and when execution of the draw B command is successfully completed, then information identifying the draw B command is written to the same second memory location 134, overwriting any information that may be already there; and so on.

Figure 4A:
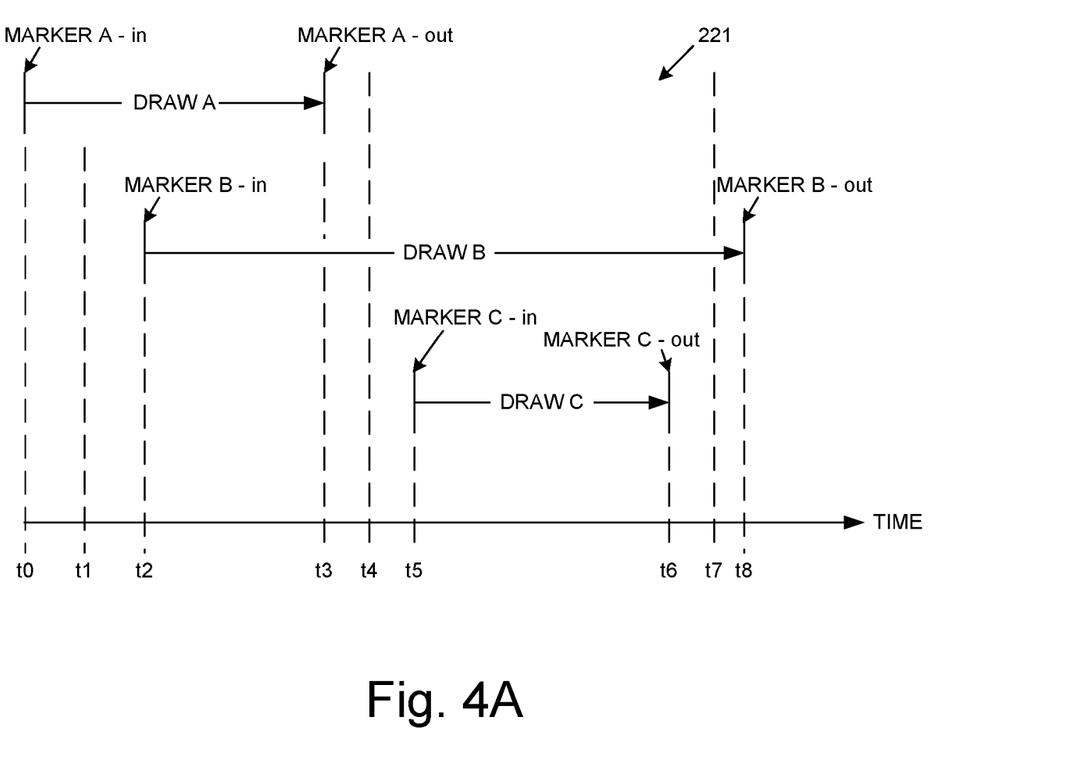
FIG. 4A is a timeline illustrating execution of commands in a pipeline in embodiments according to the present invention.
Figure 4B:
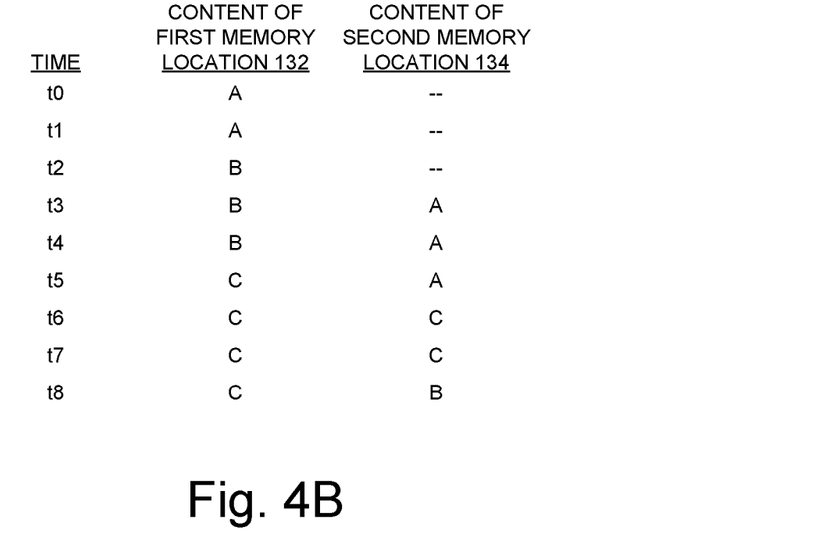
FIG. 4B illustrates the contents of a memory location at various points in time during execution of commands in a pipeline in embodiments according to the present invention.

FIG. 4A is a timeline illustrating Example 2. In this example, if the GPU 112 does not enter an invalid state, then the contents of the memory locations 132 and 134 as a function of time are shown in FIG. 4B.

In the FIG. 4A example, if the GPU 112 enters an invalid state before time t2 (e.g., at time t1), then the first memory location 132 includes information identifying the draw A command and the second memory location 134 does not include valid information. If the GPU 112 enters an invalid state between times t2 and t4 (e.g., at time t3), then the first memory location 132 includes information identifying the draw B command and the second memory location 134 includes information identifying the draw A command. If the GPU 112 enters an invalid state between times t4 and t6 (e.g., at time t5), then the first memory location 132 includes information identifying the draw C command and the second memory location 134 includes information identifying the draw A command; and so on.

The examples above are based on parallel processing of draw commands in one pipeline of the GPU 112. Those examples can be extended to other types of commands (e.g., compute commands) and the use of multiple, parallel pipelines. A command stream that includes other types of commands can include marker commands in a manner similar to the examples above. With the use of multiple pipelines, each pipeline will be associated with its own single memory location as in the example of FIG. 3A or its own set of paired memory locations as in the example of FIG. 4A. With reference to FIG. 1, a first memory location is uniquely associated with the pipeline 221 and a second, different memory location is uniquely associated with the pipeline 222 in the example of FIG. 3A. Similarly, a first pair of memory locations is uniquely associated with the pipeline 221 and a second, different pair of memory locations is uniquely associated with the pipeline 222 in the example of FIG. 4A.

If the GPU 112 enters an invalid state, then the CPU 106 can access the marker information in the memory location 132 (the example of FIG. 3A) or in the memory locations 132 and 134 (the example of FIG. 4A) to identify to identify a command that successfully executed before the invalid state occurred. In the above examples, the marker information in the memory location 132 or the memory locations 132 and 134 can be used to identify the last command to successfully execute before the invalid state occurred. This information can be used to identify which command or commands the GPU was executing when the invalid state occurred. In this manner, the search for the root cause of the invalid state can be narrowed and even pinpointed. As noted above, by using the same memory location(s) to store marker information, the CPU 106 does not need to search for the marker information. In an embodiment, because the API 208 (FIG. 2) may not be useful if the GPU 112 is in an invalid state, the CPU 106 can execute another process to access the marker information.

Figure 5:
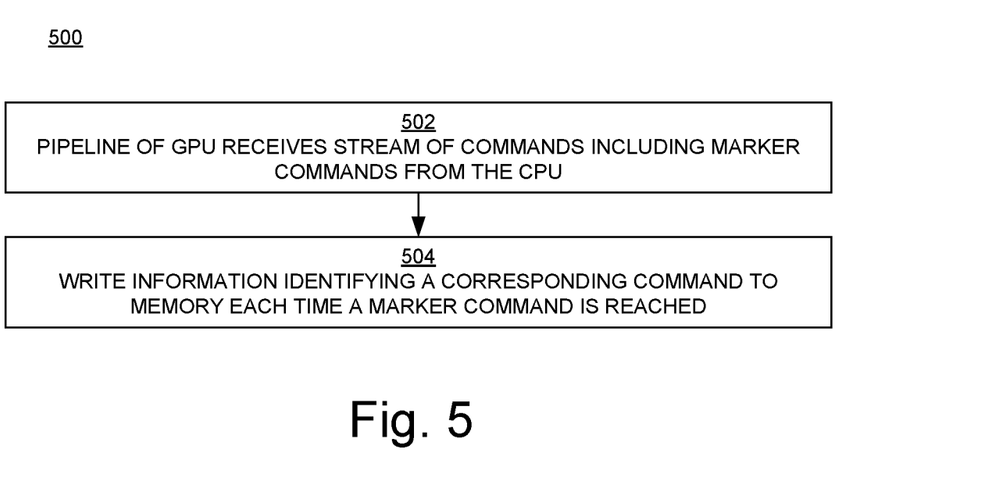
FIGS. 5 and 6 are flowcharts of examples of operations in a method for monitoring execution in a GPU in embodiments according to the present invention.

FIG. 5 is a flowchart 500 of examples of operations in a method for monitoring execution in a GPU in an embodiment according to the present invention. The operations can be performed in and by the GPU 112 of FIG. 1.

In block 502, a first stream of commands, that includes a number of commands (e.g., draw or compute commands) and a number of marker commands interleaved within those commands, are received from the CPU 106 into a first pipeline of the GPU 112. Examples of the first stream of commands are presented above.

In block 504 of FIG. 5, with reference also to FIG. 1, while the GPU 112 executes the first stream of commands in the first pipeline, information is written to a first memory location each time a marker command is reached in the first pipeline. The first memory location is accessible to the CPU 106. The information in the first memory location identifies a command executed by the GPU. In an embodiment, the information in the first memory location identifies the last command successfully executed by the GPU.

Figure 6:
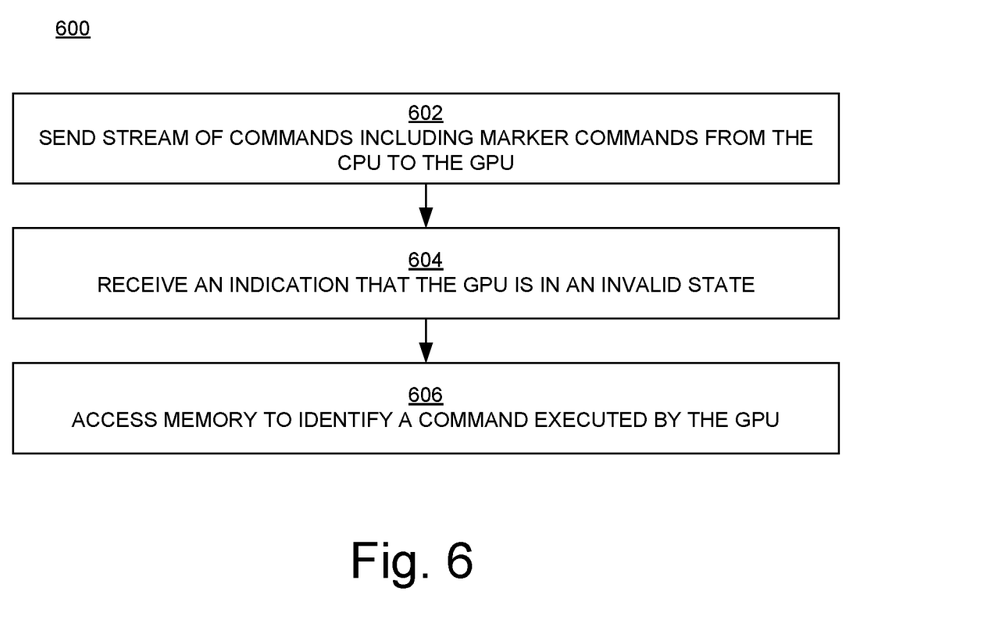

FIG. 6 is a flowchart 600 of examples of operations in a method for monitoring execution in a GPU in an embodiment according to the present invention. The operations can be performed in and by the CPU 106 of FIG. 1.

In block 602, a first stream of commands, that includes a number of commands (e.g., draw or compute commands) and a number of marker commands interleaved within those commands, are sent from the CPU 106 to the GPU 112. The GPU can then execute the first stream of commands in a first pipeline and write information to a first memory location each time a marker is reached in the first pipeline, as described above.

In block 604, the CPU 106 receives an indication that the GPU 112 is in an invalid state.

In block 606, in response to the indication, the CPU 106 accesses the first memory location to identify a command executed (e.g., the last or most recent successfully executed command) in the first pipeline of the GPU 112. That information can in turn be used to identify a command, or at least a group of commands, that was executing when the GPU entered the invalid state.

The operations described in FIGS. 5 and 6 can be performed in one or more pipelines in the GPU 112. As described above, each of the pipelines can be associated with its own memory location to store the marker information.

Thus, in embodiments according to the present invention, end users and application developers will have the information to debug or fix the application, so they can troubleshoot and debug the application without necessary involving the device (e.g., GPU) developer or operating system developer, thus saving time and resources and reducing costs.

The marker information can be used to narrow the search for the root cause of an invalid GPU state. The marker information can also be accumulated over time and across different GPUs to detect trends and classify the source(s) of invalid states, so that efforts can be prioritized to focus on the parts of applications that are causing the most occurrences of invalid states. The accumulated information can also be used to deduce scenarios that led to the invalid states and can be analyzed statistically to categorize the types of invalid states and their respective causes. For example, if the marker information predominantly identifies the draw A command as the cause of invalid states, then debugging efforts can focus there. On the other hand, if the marker information identifies the draw A, B, and C commands as nearly equal causes of invalid states, then the debugging efforts can focus on what these commands have in common (e.g., they all use the same resource).

The complexity of modern applications such as gaming applications, the number of commands in modern applications, and the number of potential causes of an invalid state, makes it difficult for, if not beyond the capability of, a human to rely on conventional techniques to debug such applications and/or identify a root cause of an invalid state.

Embodiments according to the invention thus improve both computer technologies (e.g., by making applications run correctly) and computer-related technologies (e.g., by improving debugging techniques, as well as by saving computational resources).

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The example methods described and/or illustrated herein may also omit one or more of the steps described or illustrated herein or include additional steps in addition to those disclosed.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the disclosure.

Embodiments according to the invention are thus described. While the present disclosure has been described in particular embodiments, it should be appreciated that the invention should not be construed as limited by such embodiments, but rather construed according to the following claims.

What is claimed is:

1. In a graphics processing unit (GPU), a method comprising:
   receiving, in a first pipeline of the GPU and from a central processing unit (CPU), a first stream of commands comprising a first plurality of commands, wherein a first plurality of markers are interleaved within the first plurality of commands; and
   while executing the first stream of commands in the first pipeline, writing information to a first memory location each time a marker of the first plurality of markers is reached in the first pipeline, wherein the first memory location is accessible to the CPU and wherein the information identifies a command of the first stream of commands executed by the GPU;
   wherein the GPU further comprises a second pipeline that operates in parallel with the first pipeline, wherein the method further comprises:
   receiving, in the second pipeline and from the CPU, a second stream of commands comprising a second plurality of commands, wherein a second plurality of markers are interleaved within the second plurality of commands; and
   while executing the second stream of commands in the second pipeline, writing information to a second memory location each time a marker of the second plurality of markers is reached in the second pipeline, wherein the second memory location is accessible to the CPU and wherein the information identifies a command of the second stream of commands executed by the GPU, wherein further the first memory location is associated with the first pipeline and the second memory location is associated with the second pipeline.

2. The method of claim 1, wherein the first plurality of commands comprises a first command and wherein the first plurality of markers comprises a first marker following the first command in the first stream, wherein the first marker causes first information, that identifies the first command, to be written to the first memory location after the first command finishes executing.

3. The method of claim 1, wherein the first plurality of commands comprises a first command and wherein the first plurality of markers comprises a first marker that precedes the first command in the first stream and a second marker following the first command in the first stream, wherein the first marker causes first information, that identifies the first command, to be written to the first memory location before the first command starts executing, wherein the second marker causes second information, that identifies the first command, to be written to a second memory location after the first command finishes executing, and wherein the second memory location is accessible to the CPU.

4. The method of claim 1, wherein the first plurality of commands comprises a first command and wherein the first plurality of markers comprises a first flag associated with the first command, wherein the first flag causes first information, that identifies the first command, to be written to the first memory location when the first command is executed.

5. The method of claim 1, wherein the first plurality of commands comprises a first command and wherein the first plurality of markers comprises a first semaphore following the first command in the first stream, wherein execution of the first semaphore in the first pipeline causes first information, that identifies the first command, to be written to the first memory location.

6. The method of claim 1, wherein the commands comprise a command selected from the group consisting of: a draw command, a general purpose computing command, a state programming command, and a memory transfer command.

7. In a central processing unit (CPU), a method of monitoring a graphics processing unit (GPU), the method comprising:
sending, from the CPU to the GPU, a first stream of commands comprising a first plurality of commands and a first plurality of markers interleaved within the first plurality of commands, wherein when the GPU executes the first stream of commands in a first pipeline, information is written to a first memory location each time a marker associated with the first plurality of markers is reached in the first pipeline, wherein the first memory location is accessible to the CPU and wherein the information identifies a command of the first stream of commands executed by the GPU;
sending, from the CPU to the GPU, a second stream of commands comprising a second plurality of commands and a second plurality of markers interleaved within the second plurality of commands, wherein when the GPU executes the second stream of commands in a second pipeline, information is written to a second memory location each time a marker associated with the second plurality of markers is reached in the second pipeline, wherein the second memory location is accessible to the CPU and wherein the information identifies a command of the second stream of commands executed by the GPU;
receiving, at the CPU, an indication that the GPU is in an invalid state; and
in response to the indication, accessing the first memory location to identify the command executed in the first pipeline of the GPU and accessing the second memory location to identify the command executed in the second pipeline of the GPU.

8. The method of claim 7, wherein the information comprises the CPU's call stack of the last command.

9. The method of claim 7, wherein the first stream of commands is for an application executed by the CPU, wherein the first plurality of markers is provided in the application.

10. The method of claim 7, wherein the commands comprise a command selected from the group consisting of: a draw command, a general purpose computing command, a state programming command, and a memory transfer command.

11. The method of claim 7, wherein the first plurality of commands comprises a first command and wherein the first plurality of markers comprises a first flag associated with the first command, wherein the first flag causes first information, that identifies the first command, to be written to the first memory location when the first when the first command is executed.

12. The method of claim 7, wherein the first plurality of commands comprises a first command and wherein the first plurality of markers comprises a first semaphore following the first command in the first stream, wherein execution of the first semaphore causes first information, that identifies the first command, to be written to the first memory location.

13. A system, comprising:
a central processing unit (CPU);
a graphics processing unit (GPU) coupled to the CPU and comprising a first pipeline and a second pipeline; and
memory coupled to the CPU and to the GPU;
wherein the CPU sends a first stream of commands comprising a first plurality of commands and a first plurality of markers interleaved within the first plurality of commands to the GPU;
wherein the GPU executes the first stream of commands in the first pipeline and writes information to a first location in the memory each time a marker associated with the first plurality of markers is reached in the first pipeline, wherein the information identifies the last command of the first stream of commands executed by the GPU;
wherein the CPU also sends a second stream of commands comprising a second plurality of commands and a second plurality of markers interleaved within the second plurality of commands to the GPU; and
wherein the GPU also executes the second stream of commands in the second pipeline and writes information to a second location in the memory each time a marker associated with the second plurality of markers is reached in the second pipeline, wherein the information identifies the last command of the second stream of commands executed by the GPU.

14. The system of claim 13, wherein the CPU, in response to receiving an indication that the GPU is in an invalid state, accesses the first location to identify the last command executed in the first pipeline of the GPU.

15. The system of claim 13, wherein the first plurality of commands comprises a first command and wherein the first plurality of markers comprises a first marker following the first command in the first stream, wherein the first marker causes first information, that identifies the first command, to be written to the first memory location after the first command finishes executing.

16. The system of claim 13, wherein the first plurality of commands comprises a first command and wherein the first plurality of markers comprises a first marker that precedes the first command in the first stream and a second marker following the first command in the first stream, wherein the first marker causes first information, that identifies the first command, to be written to the first memory location before the first command starts executing, wherein the second marker causes second information, that identifies the first command, to be written to a second memory location after the first command finishes executing, and wherein the second memory location is accessible to the CPU.

17. The system of claim 13, wherein the first plurality of commands comprises a first command and wherein the first plurality of markers comprises a marker selected from the group consisting of: a first flag associated with the first command, wherein the first flag causes first information, that identifies the first command, to be written to the first memory location when the first command is executed; and a first semaphore following the first command in the first stream, wherein execution of the first semaphore in the first pipeline causes first information, that identifies the first command, to be written to the first memory location.

18. The system of claim 13, wherein the first stream of commands is for an application executed by the CPU, wherein the first plurality of markers is provided in the application.

19. The system of claim 13, wherein the commands comprise a command selected from the group consisting of: a draw command, a general purpose computing command, a state programming command, and a memory transfer command.

* * * * *